United States Patent
Fan et al.

(10) Patent No.: US 8,477,371 B2
(45) Date of Patent: Jul. 2, 2013

(54) COLOR LOOKUP TABLE GENERATION WHICH MINIMIZES INTERPOLATION ERRORS OVER THE ENTIRE COLOR SPACE OF A COLOR GAMUT

(75) Inventors: Zhigang Fan, Webster, NY (US); Martin S. Maltz, Rochester, NY (US); R. Victor Klassen, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 675 days.

(21) Appl. No.: 12/769,783

(22) Filed: Apr. 29, 2010

(65) Prior Publication Data
US 2011/0267629 A1    Nov. 3, 2011

(51) Int. Cl.
*G06F 15/00* (2006.01)

(52) U.S. Cl.
USPC ........... 358/1.9; 358/504; 358/518; 358/1.16; 358/534; 382/162; 382/167; 345/589; 345/590; 345/600; 345/610

(58) Field of Classification Search
USPC .......... 358/1.9, 504, 518, 1.16, 534; 382/162, 382/167; 345/589, 590, 600, 610
See application file for complete search history.

(56) References Cited

U.S. PATENT DOCUMENTS

| | | | |
|---|---|---|---|
| 2002/0122193 A1* | 9/2002 | Shirasawa | 358/1.9 |
| 2002/0145744 A1* | 10/2002 | Kumada et al. | 358/1.9 |
| 2005/0052666 A1* | 3/2005 | Yamamoto et al. | 358/1.9 |
| 2009/0080041 A1* | 3/2009 | Fan et al. | 358/518 |
| 2009/0190144 A1 | 7/2009 | Bala et al. | |

* cited by examiner

*Primary Examiner* — Benny Q Tieu
*Assistant Examiner* — Martin Mushambo
(74) *Attorney, Agent, or Firm* — Philip E. Blair; Fleit Gibbons Gutman Bongini & Bianco P.L.

(57) ABSTRACT

What is disclosed is a novel system and method for generating a color lookup table (LUT) that minimizes interpolation errors over the entire color space, including the off-grid colors. The present method for LUT optimization considers off-grid point errors in assigning entries to the LUT. As described herein further, grid point values are computed that provide a least mean square error solution for the entire printer gamut volume. The present method dramatically reduces errors near the gamut boundary and can be used for populating nodes of any LUT that will be linearly interpolated, not only a table mapping from L*a*b* to CMYK.

18 Claims, 3 Drawing Sheets

COLOR LOOKUP TABLE GENERATION WHICH MINIMIZES INTERPOLATION ERRORS OVER THE ENTIRE COLOR SPACE OF A COLOR GAMUT

TECHNICAL FIELD

The present invention is directed to systems and methods for generating a color lookup table (LUT) that minimizes interpolation errors over the entire color space, including the off-grid colors.

BACKGROUND

Color conversion is an important procedure in the printer image processing path. It maps the desired color in a device independent (e.g. L*A*B*) space to the color in a device dependent space (e.g. CMYK). A multi-dimension lookup table (LUT) is used to do this conversion The most direct method to compute this LUT is to estimate the exact correspondence at grid points. Some interpolation method such as tetrahedral interpolation, for instance, would be used to estimate off-grid point correspondences, and any errors would be accepted as an outcome. However, these errors will be higher for off-grid colors, particularly if they are in areas of high curvature, such as the ones that lie near the gamut boundary.

Accordingly, what is needed in this art are increasingly sophisticated systems and methods for LUT generation wherein the grid colors are determined in a manner which minimizes the interpolation error for the entire color space, including errors for off-grid colors.

INCORPORATED REFERENCES

The following U.S. patents, U.S. patent applications, and Publications are incorporated herein in their entirety by reference.

"Gamut Boundary Separated Print System Profiling Methods And Systems", U.S. Patent Publication No. 20090190144, to Bala et al.

Brief Summary

What is disclosed is a novel system and method for generating a color lookup table (LUT) that minimizes interpolation errors over the entire color space, including the off-grid colors. The present method for LUT optimization considers off-grid point errors in assigning entries to the LUT. As described herein further, grid point values are computed that provide a least mean square error solution for the entire color space. The present method dramatically reduces errors of high curvature, for example, the colors near the gamut boundary.

In one example embodiment, the present method for generating an optimal color lookup table involves performing the following. First, a plurality of grid points of a color space of an output color device are defined. A plurality of vectors f, and g and a plurality of matrices C, J and W are defined. The component of vector f, given by: f(q,x,y,z), is a mapping function which maps the color at (x,y,z) to the output device colorant q. The component of vector g, given by: g(q,i,j,k), is the amount of colorant q at grid location (i,j,k) where (i,j,k) are grid indices. The elements of matrix C are the interpolation coefficients determined by the linear interpolation method. The elements of J specify a Jacobian at (x,y,z). The matrix W is a weighting matrix that determines the relative importance in color accuracy for different colors. Next, values are determined for vector f based upon either a printer model at densely sampled locations in the device color space, or by printing and measuring color patches using the output color device. A total interpolation error energy is formulated based upon the values for vector f. As described herein further, embodiment are provided for the total interpolation error energy function. An embodiment is also provided wherein the total interpolation error energy is weighted for different colors. The weighted total interpolation error energy is minimized in a manner as also provided. A LUT is generated by determining g, the LUT entries that minimize the total interpolation error energy using either iterative numerical minimization or a linear equation solution.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
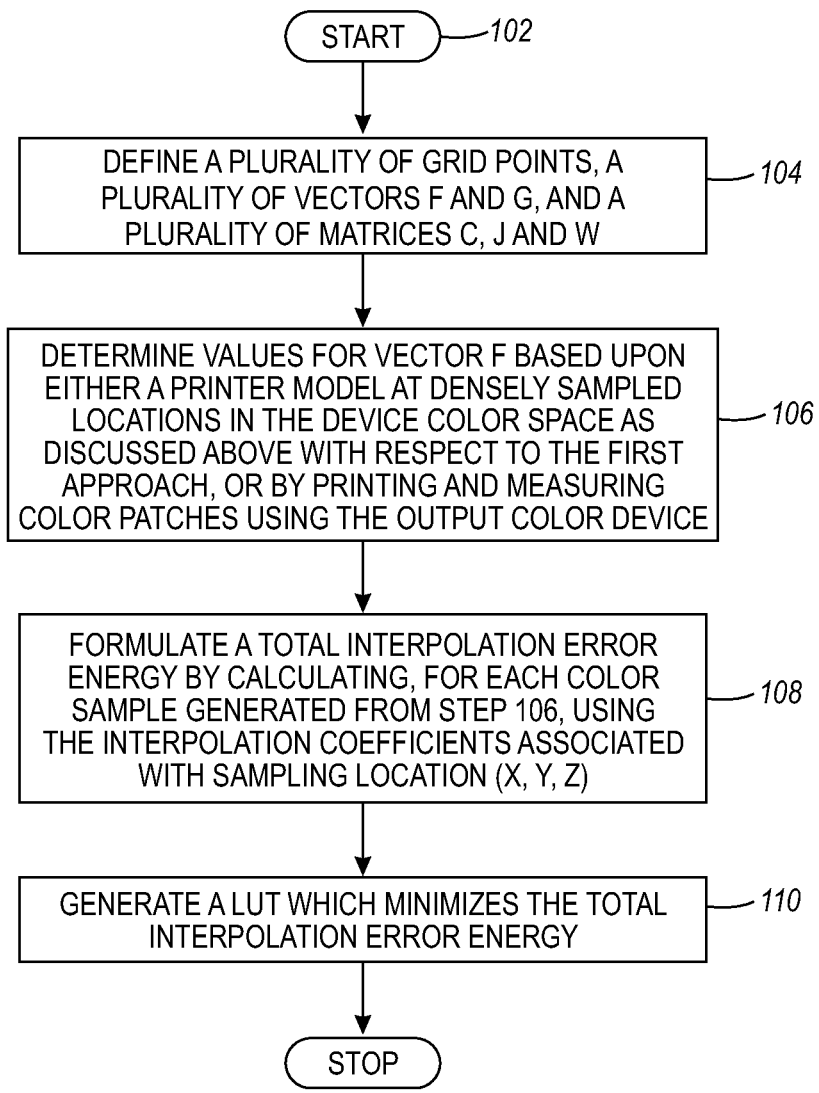
FIG. 1 illustrates one example embodiment of a flow diagram for the present method for generating a color lookup table that minimizes interpolation errors over the entire color space, including the off-grid colors.

What is disclosed is novel system and method for generating an optimal color lookup table (LUT) that minimizes interpolation errors over the entire color space, including the off-grid colors. A multi-dimension lookup table (LUT) is used to convert from device independent (LAB) color to device dependent (CMYK) color. The most direct method of doing this is to estimate the exact correspondence at grid points of the LUT, use tetrahedral interpolation to estimate all off-grid point correspondences, and accept all errors as an outcome. These errors will be higher in regions having high curvature. The present LUT optimization method considers off-grid point errors in assigning entries to the LUT. A 1-pass sparse-matrix based technique computes grid point values that provide a least mean square error solution for the entire printer gamut volume. The present method dramatically reduces errors, particularly in the areas of high curvature and near the gamut boundary.

It should be understood that one of ordinary skill in this art would be readily familiar with many facets of color science and image processing and other techniques and algorithms commonly found in the color science and document reproduction arts. Those of ordinary skill would be familiar with the text: "*Digital Color Imaging Handbook*", 1$^{st}$ Ed., CRC Press (2003), ISBN-13: 97808-4930-9007, and "*Control of Color Imaging Systems: Analysis and Design*", CRC Press (2009), ISBN-13: 97808-4933-7468, both of which are incorporated herein in their entirety by reference.

Non-Limiting Definitions

A "gamut" is a complete subset of color values of a given color space as defined by the spectrum of light, i.e., the distribution of light energy versus wavelength, interacting with the spectral sensitivities of the eye's light receptors and the colorants on the substrate. The gamut of a color marking device, for example, is a multi-dimensional color space having a given volume with the axes of the space being defined by the pigments used in the colorants of the primary colors. Each of the primary colors is transferred to the image-receiving medium. The color gamut is defined by the interaction of the primary colors, and is limited by an amount of colorant that can be deposited on the image-receiving medium.

A "Device-Independent Color Space" is any non-singular transformation from XYZ color space to another color space. This transformation in no way depends on any measurement or color reproduction device. CIE XYZ tristimulus color space is one example of a device-independent color space. Other common device-independent color spaces are CIE $L^*u^*v^*$, CIE $L^*a^*b^*$, and LCH, which are obtained from XYZ using non-linear transformations which are well understood in this art. For non-linear transformations pertinent to device-independent color spaces, see: Appendix A.6.1 of the above-referenced text: "*Control of Color Imaging Systems: Analysis and Design*".

A "Device-Dependent Color Space" is a color space which is related to CIE XYZ through a transformation that depends on a specific measurement or color reproduction device. An Example of a device-dependent color space is monitor RGB space or printer CMYK space.

A "printer model" converts values in a target color space to values in a device-independent color space. A printer model can have the form of a four-input to three-output look-up table (LUT) which can be updated using well-established techniques such as those described in Chapter 7 of the above-referenced text: "*Control of Color Imaging Systems: Analysis and Design*".

A "printer profile" generally comprises a 3-D LUT that maps from a colorimetric (LAB or XYZ) space to a device space. Entries contained within the LUT generally form a 3D grid of the order of 33×33×33 nodes, or smaller. Interpolation is used for finding device values for input colors not on the nodes. As these tables are used for processing images with potentially tens of millions of pixels, the interpolation must be simple and fast. In order to provide a simple and fast interpolation for finding device values, the nodes are arranged in a rectangular grid to make it easy to find a sub-cube that contains the desired color. The ICC profiles produced using the present method will have CMYK values in the multi-dimensional lookup table (the CLUT) that are outside the 0-255 range. The output TRC in the ICC profile, which follows the CLUT in the processing path, will clip these values to the 0-255 range. This approach produces more accurate results than clipping the values in the CLUT to the 0-255 range for reasons that will be explained.

General Discussion

As discussed in the background section hereof, the device color stored for each grid point, $g(q,i,j,k)$, where i, j, and k are grid indices and q specifies the colorant, (q=C, M, Y, or K), is determined from LAB data measured or calculated for a fixed set of CMYK values. The conventional approach attempts to determine values of the mapping function exactly at the grid points and assign them as the grid values. Specifically, it aims to measure $f(q, x=i, y=j, z=k)$ and assign:

$$g(q,i,j,k)=f(q,x=i,y=j,z=k). \quad (1)$$

However, this is difficult to achieve as the printed color can only be specified in output CMYK space, while the grid points are indexed in input device independent spaces. Measurement data are used to build the model and the grid point colors are obtained as follows:

$$g(q,i,j,k)=f^*(q,x=i,y=j,z=k), \quad (2)$$

where $f^*(c,x,y,z)$ is the M-D mapping function derived from the printer model. Note that for devices with more than three colorants, like a CMYK printer, a unique colorant formulation must be chosen for each desired color (x,y,z). Furthermore, for accurate interpolation, the colorant formulation must be a smooth function of the desired color. A classic way of doing this is to define a GCR (gray component replacement) strategy, which is a three input function that smoothly maps its input to CMYK. The corresponding color (x,y,z) can then be found by using the printer or the printer model. Other methods would also be known to one skilled in the state of the art.

In the present method, grid color determination is formulated as an optimization problem. Once a vector f conforming to the above-described uniqueness constraint is defined, these methods can be applied to any number of colorants. Error is minimized over the entire color space in a least mean square sense. Two approaches are presented. One approach is based on printer models and the second approach is based entirely on measurements.

Interpolation Error Minimization

First, let's denote $o(q,x,y,z)$ as the interpolated output device color at (x,y,z) for colorant q. The interpolated output device color $o(q,x,y,z)$ is a linear function of values at the 4 grid points forming the tetrahedron that contains (x,y,z). If o, g and f denote the vectors then the component of vector o, given by: $o(q,x,y,z)$, is an interpolated output device color comprising a linear function of values at grid points encompassing a color at (x,y,z). The component of vector f, given by: $f(q,x,y,z)$, is a mapping function which maps the color at (x,y,z) to the output device color. And, the component of vector g, given by: $g(q,i,j,k)$, is the amount of colorant q at grid location (i,j,k) where (i,j,k) are grid indices. Thus, the total interpolation error energy, e, becomes:

$$e=\|f-o\|=\|f-Cg\|, \quad (3)$$

where $\|.\|$ denotes a Euclidean norm, and C is a matrix specifying interpolation coefficients as determined by the interpolation methods applied. The interpolation error energy of Eq. (3) is a Euclidean color distance given in device color space.

If a distance for some other color space is preferred (for example, the device color space is CMYK and the error is preferred to be calculated in LAB space), Eq. (3) needs to be modified. Such a modification of the total interpolation error energy takes the form as follows:

$$e=\|J(f-o)\|=\|J(f-Cg)\|, \quad (4)$$

where J is a matrix containing Jacobians specifying the color transformation (for example, from CMYK to LAB), and C is a matrix specifying interpolation coefficients as determined by the interpolation methods applied.

Weighting can be introduced to emphasize/de-emphasize the error of different colors (in-gamut vs. out-of-gamut, flesh tone vs. other colors). In such an embodiment, the total interpolation energy error is given by:

$$e=\|WJ(f-o)\|=\|WJ(f-Cg)\|, \quad (5)$$

where W is either a matrix which comprises a weighting function or an identity matrix such that all errors due to colors in vectors f and o are equally weighted, and where J is a matrix containing Jacobians specifying the color transformation, and C is a matrix specifying interpolation coefficients as determined by the interpolation methods applied. Vector g can be determined by minimizing the total error. One example embodiment is as follows:

$$g = arg\text{Min}_g[e(g)] = arg\text{Min}_g \|WJ(f-Cg)\|, \quad (6)$$

Note that if the error term is not calculated using the Euclidian norm, but instead is calculated using a more complex color difference metric (such as CIE DE2000), the minimization may require a non-linear, iterative minimization approach. Such a technique requires a starting approximation which is then refined through successive iterations.

One good approximate solution begins with the assumption that the function being linearly interpolated is quadratic between the nodes. This is illustrated in one dimension as follows: If f is evaluated at the nodes and midpoints, then f may be approximated as:

$$f(x) = y_0 + 2(y_1 - y_0)x + (y_2 - 2y_1 + y_0)x^2$$

where x runs from 0 to 1 between two adjacent nodes, $y_0$ and $y_2$ are the values at the nodes, and the value at the midpoint is given by: $(y_0 + 2 y_1 + y_2)/4$. (A Bezier spline form is used here for convenience).

Similarly o is given by:

$$o(x) = Y_0 + (Y_1 - Y_0)x, \quad 0 \leq x < 1,$$

where $Y_0$ and $Y_1$ are the values at the nodes.

Taking the difference between f(x), and o(x), squaring it, and integrating with respect to x from 0 to 1, gives an expression to minimize.

Differentiating the expression with respect to $Y_0$ and $Y_1$ (separately), and setting those derivatives to zero, $$-3y_0 + 2Y_1 + 4Y_0 - y_2 - 2y_1 = 0,$$

and, $$4Y_1 + 2Y_0 - 2y_1 - y_0 - 3y_2 = 0.$$

Solving for $Y_0$ and $Y_1$, yields:

$$Y_1 = (-y_0 + 5y_2 + 2y_1)/6,$$

$$Y_0 = (5y_0 - y_2 + 2y_1)/6.$$

Similar manipulations hold for multiple dimensions, yielding simple analytic expressions for the optimum values at the nodes, under the assumption that the function is truly quadratic. In reality, component vector f must be estimated or measured. As previously mentioned, two approaches are provided herein.

In the first approach, f is estimated from the printer model, while in the second approach, f is measured in a sampled manner. The first proposed approach assumes the availability of a printer model. The mapping function f is estimated using the printer model at densely sampled locations in the color space. Minimization of Eq. (6) is a least square problem and the solution is well known.

$$g = [(WJC)^T WJC]^{-1} (WJC)^T WJf^*, \quad (7)$$

where the superscript T represents a matrix transpose operation, the superscript (−1) represents a matrix inverse operation, W is a diagonal matrix representing the weighting function, J is a matrix containing Jacobians specifying the color transformation, C is a matrix specifying interpolation coefficients as determined by the interpolation methods applied, and f* represents the estimation of vector f.

In the second proposed approach, color patches are attempted to be printed at and between the grid points. As previously discussed, the actual printed color may fall in the vicinity of the grid point, but not exactly on the grid point. However, no effort is made to calculate grid color through interpolation. Instead, the grid colors are adjusted to minimize the interpolation error at all these measured points. Specifically:

$$g = arg_{g^*}\text{Min}[e(g^*)] = arg_{g^*}\text{Min}\|WJ(f'-Cg^*)\|, \quad (8)$$

where W is a diagonal matrix representing the weighting function, J is a matrix containing Jacobians specifying the color transformation, C is a matrix specifying interpolation coefficients as determined by the interpolation methods applied, g* is the set of all possible g vectors and the vector producing the lowest total interpolation error energy e is g, and where f'(q,x,y,z) specifies the measured color.

If the problem is determined, Eq. (8) can be solved by a matrix inversion, given by:

$$g = C^{-1}f', \quad (9).$$

where f'(q,x,y,z) specifies the measured color.

If the problem is over-determined, then g is given as:

$$g = [(WJC)^T WJC]^{-1} (WJC)^T WJf', \quad (10).$$

where f'(q,x,y,z) specifies the measured color.

It should be appreciated that for any of Eqs. (4), (5), (6), (7), (8), and (10), matrix J may transform from a device color space to a space, i.e., L*a*b*, for example, where the Euclidian distance is a more appropriate measure of the perceived color error.

The interpolation errors discussed above are most severe for colors near or at the surface of the gamut of a printer. In order to find CMYK formulations for these colors, the LUT must interpolate between some in gamut nodes and nodes that are outside the gamut of the printer. The CMYK formulations for the out of gamut nodes are usually determined by mapping the LAB of the out of gamut node to an LAB on the surface of the gamut, and then finding a CMYK formulation that can make it (there is generally only one) by iterative printing or from the printer model. However the true surface of the gamut generally will lie between the in/out of gamut nodes, so the formulation of colors at the surface will be found by interpolating between a formulation that makes a color well within the gamut, and one that is on the surface of the gamut. Therefore the interpolated formulation will give a color well inside the gamut, which is not what is desired. To get better values for the colors at the surface of the gamut, the formulations stored in the out of gamut nodes must use CMYK values that are outside the range of 0-255 (extrapolated values). This can be done by using the above-described equations. A suitable set of CMYK/LAB pairs for determining the matrices and vectors that go into these equations is the set of CMYKs found for all the nodes using conventional techniques, and then mapped through the printer model or printed to get the corresponding LAB values. Usually 75% or more of the nodes are out of gamut, and when mapped to the surface of the gamut, give a large number of training points in the region of interest. This technique is used for generating LAB to CMYK rendering LUTs from CMYK to LAB printer models.

Reference is now being made to the flow diagram of FIG. 1 which illustrates one example embodiment of the present method for generating a color lookup table that minimizes interpolation errors over the entire color space, including the off-grid colors. Processing starts at step 102 and immediately proceeds to step 104.

At step 104, a plurality of grid points, a plurality of vectors f, and g, and a plurality of matrices C, J and W, are defined. The grid points are defined in a color space of an output color device. The component of vector f, given by: f(q,x,y,z), is a mapping function which maps the color at (x,y,z) to the output device color separation q. The component of vector g, given by: g(q,i,j,k), is the amount of colorant q at grid location (i,j,k) where (i,j,k) are grid indices. The elements of matrix C are the interpolation coefficients determined by the linear interpolation method. The elements of J specify the Jacobian at (x,y,z). Matrix W is a weighting matrix that determines the relative importance in color accuracy for different colors. It is determined by experience, and is known at this point.

At step 106, values are determined for vector f. This determination is based upon either a printer model at densely sampled locations in the device color space as discussed above with respect to the first approach, or by printing and measuring color patches using the output color device as discussed above with respect to the second approach.

At step 108, a total interpolation error energy is formulated by calculating, for each color sample generated from step 106 using the interpolation coefficients associated with the color sampling point (x,y,z). The interpolation coefficients are determined by the relative positions between (x,y,z) and the grid points. This is the contribution of each grid node to the location (x,y,z) when a linear interpolation is performed. For a tetrahedral interpolation, at most four grid nodes, which are the ones forming the tetrahedron that contains (x,y,z), have non-zero contributions. If the interpolation was performed in a color space which is the same as the color space of the output color device, the total interpolation error energy is computed in a manner as shown by Eq. (3). Otherwise, the total interpolation error energy is computed as shown by Eq. (4), and the Jacobians need to be estimated at each sampling location (x,y,z). This can be done by fitting the f(q,x,y,z) data. The total interpolation error energy can be weighted for different colors. In such an embodiment, the total interpolation error energy is computed and minimized in accordance with the above-described embodiments.

At step 110, the system generates a LUT by determining g: the LUT entries that minimize the total interpolation error energy using either iterative numerical minimization or linear equation solution. Thereafter, processing stops.

Figure 2:
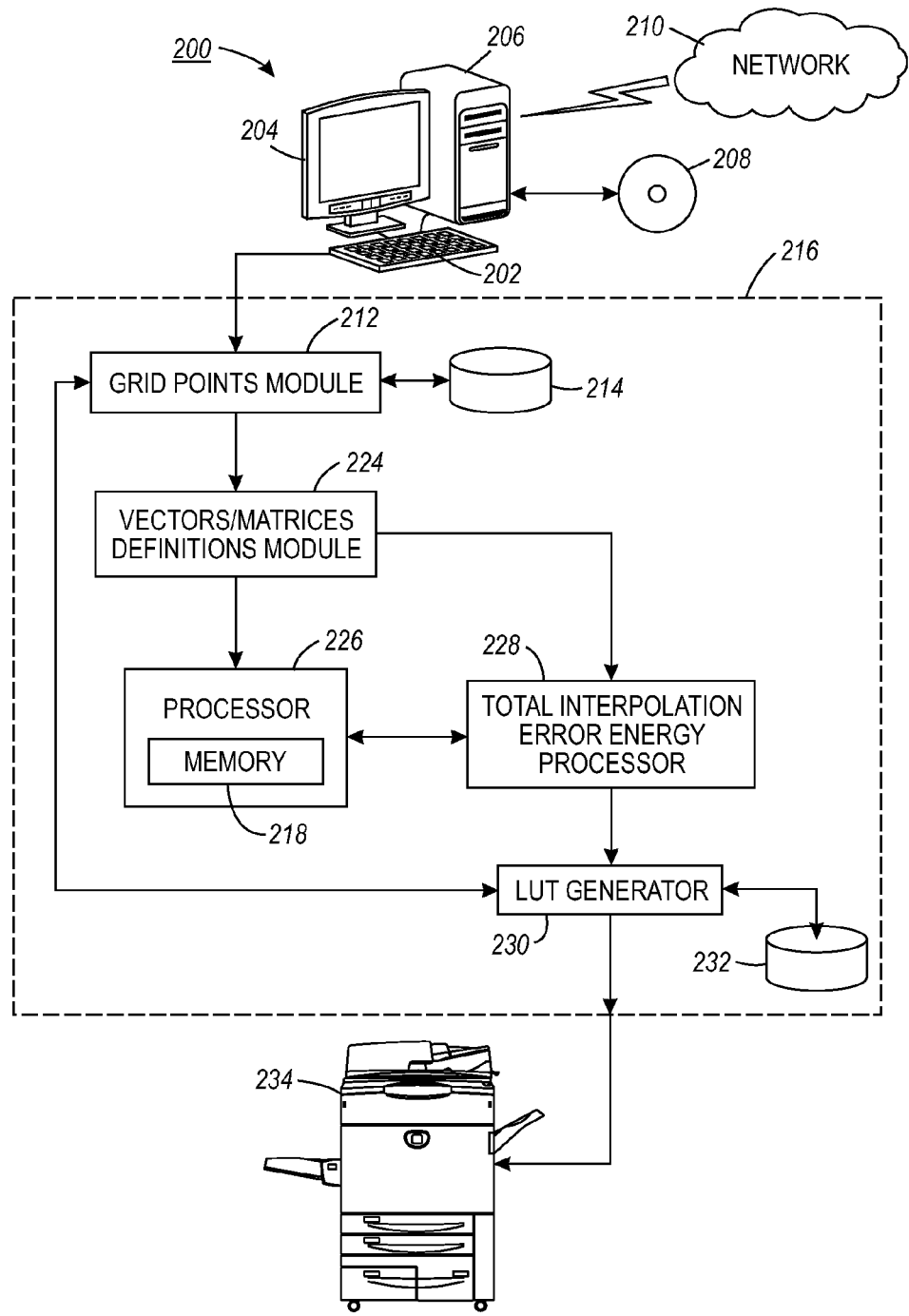
FIG. 2 is a block diagram of an example LUT generation system wherein various aspects of the present gamut mapping method are performed in a manner as described with respect to the flow diagrams of FIG. 1.

Reference is now being made to FIG. 2 which is a block diagram of an example LUT generation system wherein various aspects of the present gamut mapping method are performed in a manner as described with respect to the flow diagrams of FIG. 1.

The illustrated embodiment shown generally comprises a computer workstation 200 which includes a keyboard 202, monitor 204, case 206 housing a motherboard, processor, hard drive, CD-ROM drive, and a network interface card (not shown), and a rewriteable media 208 for storing executable machine readable program instructions and data. Computer workstation 200 is in communication with one or more devices (not shown) over network 210 and storage device 214.

The LUT generation system 216 is shown generally comprising the following modules and units. Grid point module 212 provides a plurality of grid points as input to LUT Generation System 216. Such points may be retrieved from storage device 214 or obtained from workstation 200. Some or all of the grid points may be provided as input by a user through the graphical user interface of workstation 200 or retrieved from a remote device over network 210. Storage device 214 (and storage device 232) may comprise memory, cache memory, ROM/RAM, a database system, or a remote device accessible over network 210. Each of the storage devices of FIG. 2 may be the same device or may be equally accessible by any of the modules of system 216. Vectors and Matrices Definition Module 224 defines a plurality of vectors f, and g, and matrices C, J, and W. As described above in further detail, the component of vector f, given by: f(q,x,y,z), is a mapping function which maps the color at (x,y,z) to the output device color. The component of vector g, given by: g(q,i,j,k), is the amount of colorant q at grid location (i,j,k) where (i,j,k) are grid indices. The elements of matrix C are the interpolation coefficients determined by the linear interpolation method. The elements of matrix J specify the Jacobian at (x,y,z). The elements of matrix W determine a relative importance in color accuracy for different colors. Grid points, vectors f and g, and matrices C, J, and W are provided to Processing Unit 226 which, according to the embodiments described above, determines a value for vector f based upon either a printer model at densely sampled locations in the device color space as discussed above with respect to the first approach, or by printing and measuring color patches using the output color device as discussed above with respect to the second approach. Processor 226 utilizes a local memory 218 to effectuate processing and provides input to Total Interpolation Error Energy Processor 228 which formulates a total interpolation error energy in a manner as described above with respect to Eqs. (3), (4) or (5). The total interpolation error energy is provided to LUT generator 230, along with the grid points of the LUT from grid point module 212, and generates a multi-dimensional LUT for output device 234 by determining g, the LUT entries that minimize the total interpolation error energy. The LUT is saved to storage device 232.

It should be appreciated that any of the modules and processing units shown and described with respect to the block diagram of FIG. 2 are in communication with computer workstation 200, and some or all of the functionality described for any of these modules may be performed, in whole or in part, within workstation 200 or by a special purpose computer system. It should be appreciated that various modules may designate one or more components which may, in turn, each comprise software and/or hardware designed to perform a specific function. A plurality of modules may collectively perform a single function. A module may have a specialized processor capable of reading machine executable program instructions. A module may comprise a single piece of hardware such as an ASIC, electronic circuit, or special purpose processor. A plurality of modules may be executed by either a single special purpose computer system or a plurality of special purpose computer systems in parallel. One such special purpose computer system is shown and discussed with respect to FIG. 3. Connections between modules includes both physical and logical connections. Modules may further include one or more software/hardware modules which may further comprise an operating system, drivers, device controllers, and other apparatuses some or all of which may be connected via a network.

It is also contemplated that one or more aspects of the present method may be implemented on a dedicated computer system or workstation, and may also be practiced in distributed computing environments where tasks are performed by remote processing devices that are linked through a communication network. In a distributed computing environment, program modules for performing various aspects of the present system and method. Other embodiments include a special purpose computer designed to perform the methods disclosed herein.

Figure 3:
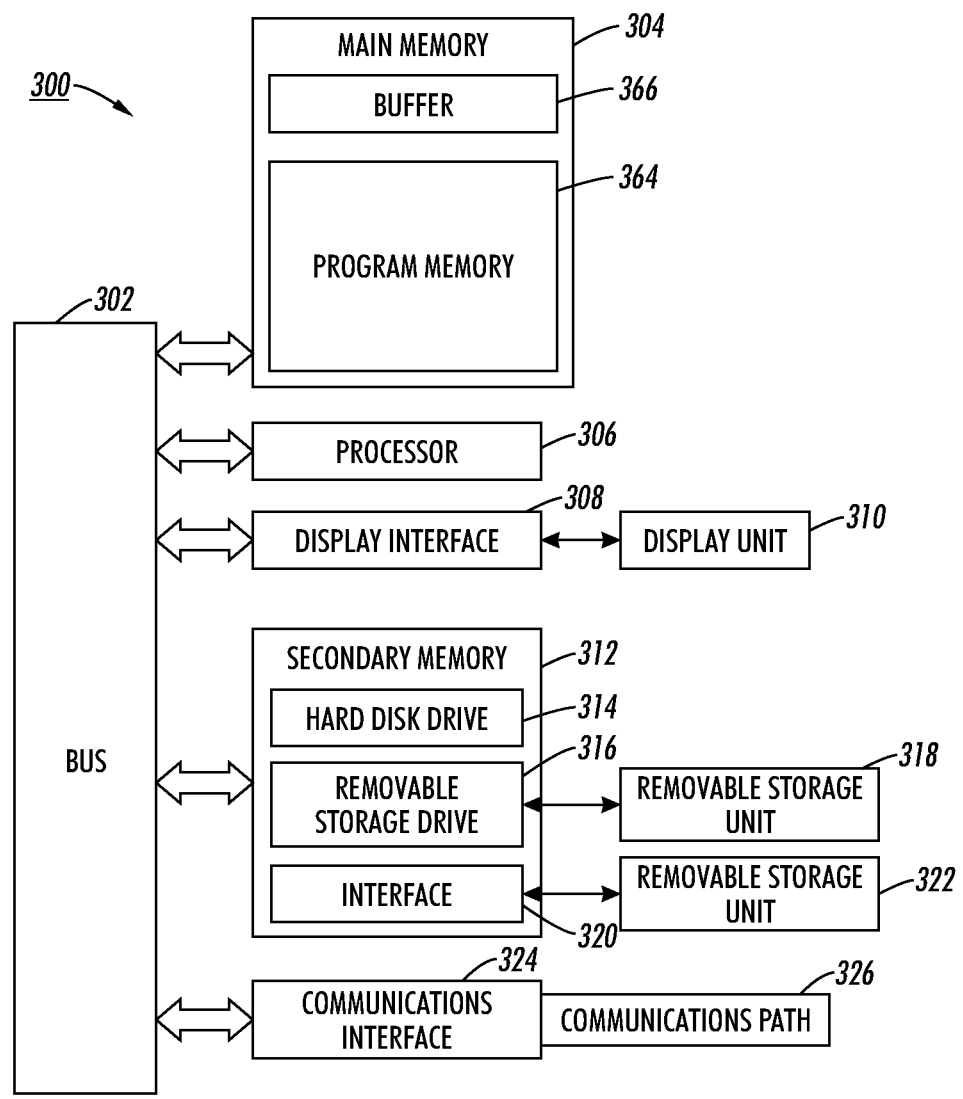
FIG. 3 illustrates one example special purpose computer for implementing one or more aspects of the present method as described with respect to the flow diagram of FIG. 1 and the block diagram of FIG. 2.

Reference is now being made to FIG. 3 which illustrates a block diagram of one example embodiment of a special purpose computer system for implementing one or more aspects of the present method as described with respect to the embodiments of the flow diagram of FIG. 1 and the block diagram of FIG. 2. Such a special purpose processor is capable of executing machine executable program instructions. The special purpose processor may comprise any of a micro-processor or micro-controller, an ASIC, an electronic circuit, or special purpose computer. Such a computer can be integrated, in whole or in part, with a xerographic system or a color management or image processing system, which includes a processor capable of executing machine readable program instructions for carrying out one or more aspects of the present method.

Special purpose computer system 300 includes processor 306 for executing machine executable program instructions for carrying out all or some of the present method. The processor is in communication with bus 302. The system includes main memory 304 for storing machine readable instructions. Main memory may comprise random access memory (RAM) to support reprogramming and flexible data storage. Buffer 366 stores data addressable by the processor. Program memory 364 stores machine readable instructions for performing the present method. A display interface 308 forwards data from bus 302 to display 310. Secondary memory 312 includes a hard disk 314 and storage device 316 capable of reading/writing to removable storage unit 318, such as a floppy disk, magnetic tape, optical disk, etc. Secondary memory 312 may further include other mechanisms for allowing programs and/or machine executable instructions to be loaded onto the processor. Such mechanisms may include, for example, a storage unit 322 adapted to exchange data through interface 320 which enables the transfer of software and data. The system includes a communications interface 324 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 326 which carries such signals and may be implemented using wire, cable, fiber optic, phone line, cellular link, RF, memory, or other means known in the arts.

It should be understood that the flow diagrams depicted herein are illustrative. One or more of the operations illustrated in any of the flow diagrams may be performed in a differing order. Other operations, for example, may be added, modified, enhanced, condensed, integrated, or consolidated. Variations thereof are envisioned, and are intended to fall within the scope of the appended claims. All or portions of the flow diagrams may be implemented partially or fully in hardware in conjunction with machine executable instructions in communication with various components of such a system.

The methods described can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine, that is in turn capable of implementing one or more elements of the flow diagrams provided herewith, or portions thereof, can be used. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately, either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting.

Various changes to the above-described embodiments may be made without departing from the spirit and scope of the invention. The teachings of any printed publications including patents and patent applications, are each separately hereby incorporated by reference in their entirety.

What is claimed is:

1. A method for generating a color lookup table, the method comprising:

defining a plurality of grid points of a color space of an output color device and vectors f, and g, where the component of vector f, given by: f(q,x,y,z), is a mapping function which maps the color at (x,y,z) to the amount of output device colorant q, and where the component of vector g, given by: g(q,i,j,k), is the amount of colorant q at grid location (i,j,k) where (i,j,k) are grid indices;

determining values for vector f based upon any of: a printer model at densely sampled locations in said device color space, or by printing and measuring color patches using said output color device;

formulating a total interpolation error energy based upon said values for vector f, wherein, in response to said interpolation having been performed in a color space which is a same as the color space of said output color device, said total interpolation error energy comprising:

$$e = \|f - Cg\|$$

otherwise comprising:

$$e = \|J(f - Cg)\|,$$

where J is a matrix containing Jacobians which specifies a color transformation or is a matrix which transforms from a device color space to another color space where a Euclidian distance is a more appropriate measure of the perceived color error, and where C is a matrix of interpolation coefficients defined by said interpolation; and generating a LUT by determining g, the LUT entries that minimize said total interpolation error energy.

2. The method of claim 1, wherein said total interpolation error energy is weighted for different colors, comprising:

$$e=\|WJ(WJ(f-Cg)\|,$$

where W is either a matrix which comprises a weighting function or an identity matrix such that all errors due to colors in vectors f and o are equally weighted.

3. The method of claim 2, further comprising minimizing said weighted total interpolation error energy, vector g comprising:

$$g=arg_{g*}\text{Min}[e(g*)]=arg_{g*}\text{Min}\|WJ(f'-Cg*)\|--|--,$$

where f'(q,x,y,z) is a vector specifying a measured color, g* is the set of all possible g vectors and the vector producing the lowest total interpolation error energy e is g.

4. The method of claim 2, wherein in response to vector f being determined using said printer model, vector g comprising:

$$g=[(WJC)^TWJC]^{-1}[(WJC)^TWJf^*--]--,$$

where W is either a diagonal matrix which comprises a weighting function or an identity matrix such that all errors due to colors in vectors f and o are equally weighted, f*(q,x,y,z) is the multi-dimensional mapping function derived from a printer model of said output color device, and T is a matrix transpose.

5. The method of claim 2, wherein in response to f being estimated using said sampled measurements of measured color, vector g comprising:

$$g=[(WJC)^TWJC]^{-1}[(WJC)^TWJf'--]--,$$

where f'(q,x,y,z) specifies the measured color.

6. The method of claim 5, wherein, in the case where C is a non-singular square matrix, vector g comprising:

$$g=C^{-1}f'',$$

where f''(q,x,y,z) is one of: f'(q,x,y,z) and f(q,x,y,z).

7. A system for generating a color lookup table that minimizes interpolation errors over the entire color space, said system comprising:

a memory;
a storage medium for storing data; and
a processor in communication with said storage medium and said memory, said processor executing machine readable instructions for performing the method of:
defining a plurality of grid points of a color space of an output color device and vectors f, and g, where the component of vector f, given by: f(q,x,y,z), is a mapping function which maps the color at (x,y,z) to the amount of output device colorant q, and where the component of vector g, given by: g(q,i,j,k), is the amount of colorant q at grid location (i,j,k) where (i,j,k) are grid indices;
determining values for vector f based upon any of: a printer model at densely sampled locations in said device color space, or by printing and measuring color patches using said output color device;
formulating a total interpolation error energy based upon said values for vector f, wherein, in response to said interpolation having been performed in a color space which is the same as the color space of said output color device, said total interpolation error energy comprising:

$$e=\|f-Cg\|,$$

otherwise comprising:

$$e=\|J(f-Cg)\|,$$

where J is a matrix containing Jacobians which specifies a color transformation or is a matrix which transforms from a device color space to another color space where a Euclidian distance is a more appropriate measure of the perceived color error, and where C is a matrix of interpolation coefficients defined by said interpolation; and generating a LUT by determining g, the LUT entries that minimize said total interpolation error energy.

8. The system of claim 7, wherein said total interpolation error energy is weighted for different colors, comprising:

$$e=\|WJ(f-Cg)\|,$$

where W is either a matrix which comprises a weighting function or an identity matrix such that all errors due to colors in vectors f and o are equally weighted.

9. The system of claim 8, further comprising minimizing said weighted total interpolation error energy, vector g comprising:

$$g=arg_{g*}\text{Min}[e(g*)]=arg_{g*}\text{Min}\|WJ(f'-Cg*)\|--\|--,$$

where f'(q,x,y,z) is a vector specifying a measured color, g* is the set of all possible g vectors and the vector producing the lowest total interpolation error energy e is g.

10. The system of claim 8, wherein in response to vector f being determined using said printer model, vector g comprising:

$$g=[(WJC)^TWJC]^{-1}[(WJC)^TWJf^*--]--,$$

where W is either a diagonal matrix which comprises a weighting function or an identity matrix such that all errors due to colors in vectors f and o are equally weighted, f*(q,x,y,z) is the multi-dimensional mapping function derived from a printer model of said output color device, and T is a matrix transpose.

11. The system of claim 8, wherein in response to f being estimated using said sampled measurements of measured color, vector g comprising:

$$g=[(WJC)^TWJC]^{-1}[(WJC)^TWJf--]--,$$

where f'(q,x,y,z) specifies the measured color.

12. The system of claim 11, wherein, in the case where C is a non-singular square matrix, vector g comprising:

$$g=C^{-1}f'',$$

where f''(q,x,y,z) is one of: f'(q,x,y,z) and f(q,x,y,z).

13. A computer implemented method for generating a color lookup table that minimizes interpolation errors over the entire color space, the method comprising:

defining a plurality of grid points of a color space of an output color device and vectors f, and g, where the component of vector f, given by: f(q,x,y,z), is a mapping function which maps the color at (x,y,z) to the amount of output device colorant q, and where the component of vector g, given by: g(q,i,j,k), is the amount of colorant q at grid location (i,j,k) where (i,j,k) are grid indices;
formulating values for vector f based upon any of: a printer model at densely sampled locations in said device color space, and by printing and measuring color patches using said output color device;
calculating a total interpolation error energy based upon said values for vector f, wherein, in response to said interpolation having been performed in a color space which is a same as the color space of said output color device, said total interpolation error energy comprising:

$$e=\|f-Cg\|,$$

otherwise comprising:

$$e=\|J(f-Cg)\|,$$

where J is a matrix containing Jacobians which specifies a color transformation or which transforms from a device color space to a space where a Euclidian distance is a more appropriate measure of the perceived color error, and where C is a matrix of interpolation coefficients defined by said interpolation; and generating a LUT by determining g, the LUT entries that minimize said total interpolation error energy.

14. The method of claim 13, wherein said total interpolation error energy is weighted for different colors, comprising:

$$e=\|WJ(f-Cg)\|,$$

where W is either a matrix which comprises a weighting function or an identity matrix such that all errors due to colors in vectors f and o are equally weighted.

15. The method of claim 14, further comprising minimizing said weighted total interpolation error energy, vector g comprising:

$$g=arg_{g^*}\text{Min}[e(g^*)]=arg_{g^*}\text{Min}\|WJ(f'-Cg^*)\|--\|--,$$

where f'(q,x,y,z) is a vector specifying a measured color, g* is the set of all possible g vectors and the vector producing the lowest total interpolation error energy e is g.

16. The method of claim 14, wherein in response to vector f being determined using said printer model, vector g comprising:

$$g=[(WJC)^TWJC]^{-1}[(WJC)^TWJf^*--]--,$$

where W is either a diagonal matrix which comprises a weighting function or an identity matrix such that all errors due to colors in vectors f and o are equally weighted, f*(q,x,y,z) is the multi-dimensional mapping function derived from a printer model of said output color device, and T is a matrix transpose.

17. The method of claim 14, wherein in response to f being estimated using said sampled measurements of measured color, vector g comprising:

$$g=[(WJC)^TWJC]^{-1}[(WJC)^TWJf--]--,$$

where f'(q,x,y,z) specifies the measured color.

18. The method of claim 17, wherein, in the case where C is a non-singular square matrix, vector g comprising:

$$g=C^{-1}f'',$$

where f''(q,x,y,z) is one of: f'(q,x,y,z) and f(q,x,y,z).

* * * * *